(12) United States Patent
Weber

(10) Patent No.: US 10,259,075 B2
(45) Date of Patent: Apr. 16, 2019

(54) CUTTING DEVICE FOR TRANSDERMAL AND ORALLY DISSOLVABLE FILMS

(71) Applicant: Vektor Pharma TF GmbH, Uttenweiler (DE)

(72) Inventor: Roland Anton Weber, Birkenhard (DE)

(73) Assignee: Vektor Pharma TF GmbH, Uttenweiler (DE)

( * ) Notice: Subject to any disclaimer, the term of this patent is extended or adjusted under 35 U.S.C. 154(b) by 534 days.

(21) Appl. No.: 14/538,415

(22) Filed: Nov. 11, 2014

(65) Prior Publication Data

US 2015/0060420 A1    Mar. 5, 2015

Related U.S. Application Data

(63) Continuation of application No. 13/220,404, filed on Aug. 29, 2011, now Pat. No. 8,901,456.

(30) Foreign Application Priority Data

Aug. 27, 2010    (EP) .................................... 10008939

(51) Int. Cl.
| | |
|---|---|
| *B23K 26/08* | (2014.01) |
| *B23K 26/50* | (2014.01) |
| *B23K 26/36* | (2014.01) |
| *B23K 26/38* | (2014.01) |
| *B31D 1/02* | (2006.01) |
| *B23K 26/364* | (2014.01) |
| *B23K 26/40* | (2014.01) |

(Continued)

(52) U.S. Cl.
CPC .......... *B23K 26/0846* (2013.01); *B23K 26/36* (2013.01); *B23K 26/361* (2015.10); *B23K 26/364* (2015.10); *B23K 26/38* (2013.01); *B23K 26/40* (2013.01); *B23K 26/50* (2015.10); *B31D 1/021* (2013.01); *B31D 1/026* (2013.01); *B23K 2101/16* (2018.08); *B23K 2101/34* (2018.08); *B23K 2103/08* (2018.08); *B23K 2103/16* (2018.08); *B23K 2103/172* (2018.08); *B23K 2103/42* (2018.08)

(58) Field of Classification Search
CPC ............ B23K 26/0054; B23K 26/0846; B23K 26/36; B23K 26/367; B23K 26/38; B23K 26/409; B23K 26/365; B23K 2201/16; B23K 2201/34; B23K 2203/02; B23K 2203/08; B23K 2203/16; B31D 1/021; B31D 1/026
USPC .............. 219/121.6, 121.64, 121.67–121.69, 219/121.71–121.73, 121.82, 121.85, 201, 219/216, 469–471; 399/328–338, 285, 399/286
See application file for complete search history.

(56) References Cited

U.S. PATENT DOCUMENTS

| | | | |
|---|---|---|---|
| 4,642,659 A * | 2/1987 | Nagashima | .............. B41J 2/325 346/105 |
| 5,902,433 A | 3/1999 | Becher et al. | |

(Continued)

FOREIGN PATENT DOCUMENTS

DE    102004059766    6/2006

*Primary Examiner* — Shawntina T Fuqua
(74) *Attorney, Agent, or Firm* — Brinks Gilson & Lione

(57) ABSTRACT

The invention relates to methods and an apparatus for cutting planar substrates charged with pharmaceutically active agents. In particular, the planar substrates comprise transdermal systems or orally dissolvable films.

2 Claims, 2 Drawing Sheets

(51) Int. Cl.
  *B23K 26/361*   (2014.01)
  *B23K 101/16*   (2006.01)
  *B23K 101/34*   (2006.01)
  *B23K 103/08*   (2006.01)
  *B23K 103/16*   (2006.01)
  *B23K 103/00*   (2006.01)

(56) References Cited

U.S. PATENT DOCUMENTS

2003/0000639 A1    1/2003  Akemi et al.
2008/0263841 A1*  10/2008  Stelzl .................... B21D 31/04
                                                            29/6.1

\* cited by examiner

CUTTING DEVICE FOR TRANSDERMAL AND ORALLY DISSOLVABLE FILMS

CROSS REFERENCE TO RELATED APPLICATIONS

This application is a continuation of U.S. application Ser. No.: 13/220,404 filed Aug. 29, 2011, which claims priority to European Application No: 10008939.0 filed Aug. 27, 2010, each of which are incorporated herein in its entirety.

TECHNICAL FIELD

The invention relates to methods and an apparatus for cutting planar substrates charged with pharmaceutically active agents.

BACKGROUND OF THE INVENTION

Planar substrates charged with pharmaceutically active agents are usefully employed in numerous applications. For example, planar substrates can be formed from plasters charged with pharmaceutically active agents being placed on a support and further covered with a cover layer for purposes of sealing and/or packaging them. These active agent plasters may be embodied in the form of a transdermal system (TDS). These TDSs must be cut to form patches and, therefore, must be cut lengthwise and/or completely apart during their production to arrive at the finished product. Alternatively, plasters charged with pharmaceutically active agents can be formulated without a support layer, wherein parts of the planar substrates charged with pharmaceutically active agents can be separated and can, for example, be taken orally as lozenges.

In the pharmaceutical industry, a TDS may comprise laminates of several layers of different films. The films are often formed in TDSs with adhesives such as acrylates. Additional planar substrates common to the pharmaceutical industry include orally dissolvable films (ODFs) that can be formed in a fashion similar to TDSs. All of these systems must be cut to form the finished product either as a patch or other small form for administration to a patient. TDSs and ODFs are commonly cut to size by means of stamping machines or presses. These stamping machines, which usually cut through the films in a roller mill, press cutting tools against each other at high pressure and thus cleave the film systems that are to be processed. Another application for processing TDSs and OOFs consists of cleaving them with two cutting edges moving in opposite directions, as is the case with shears or knives.

These processes are very limited in their application as they are not capable of producing final products in complex shapes or can do so only at a very high cost. In addition, changing the cutting devices to produce a differently shaped final product is time consuming and each product shape requires a new cutting blade setup or stamping tool. Further, the high mechanical cutting forces involved in cutting TDSs and ODFs with a stamping tool cause high wear on the tool, necessitating frequent and costly replacement. Also, in multilayer TDSs, it is difficult to cut through all of the layers or to selectively cut only the sub-layers of the systems during production.

Devices and methods for cutting planar substrates are well known in the art, such as those described in WO 97/11841. Such devices usually use vacuum suctioning devices in a cutting zone to position the planar substrate in a plane, so that precise cuts can be performed in the desired position. Such devices and/or methods necessitate, however, the use of a vacuum holding device, leading to additional device-related operating and maintenance costs. Additionally, suitable vacuum systems are susceptible to malfunction, since proper operation requires the contact surface of a planar substrate to be positioned precisely over the vacuum suctioning devices so that a seal is formed while maintaining mobility of the substrate at the same time.

Thus, improved methods and apparatus for cutting planar substrates that are simple to configure and are more resistant to malfunctions are highly desired.

SUMMARY OF THE INVENTION

Figure 1:
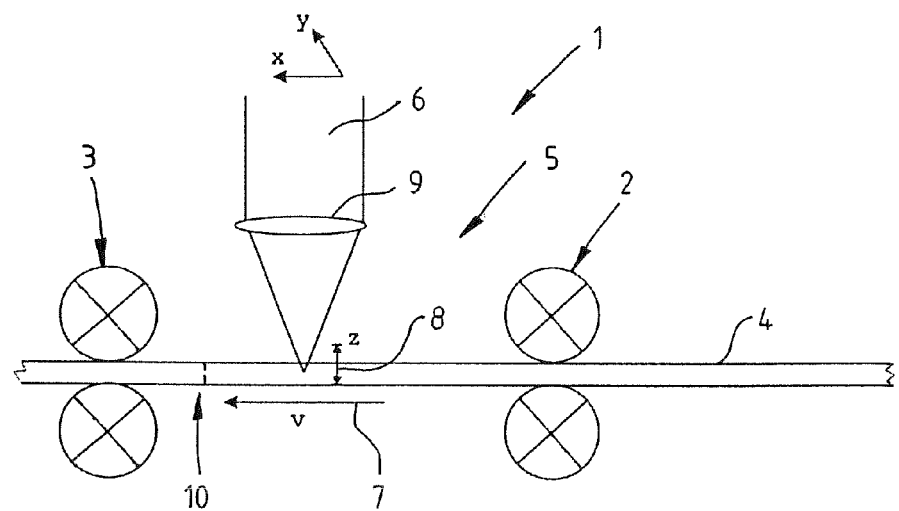
FIG. 1 is a schematic of one embodiment of an apparatus of the present invention wherein the planar substrate is a continuous single-layer substrate.

In one aspect, the present invention provides an apparatus for cutting continuous planar substrates charged with pharmaceutically active agents, wherein the apparatus comprises:

a feeding mechanism, wherein the feeding mechanism comprises a first and a second pair of rollers;

a cutting zone, wherein the cutting zone is between the pairs of rollers; and one or more cutting lasers capable of making segment-like cuts in the substrate within the cutting zone.

In another aspect, the present invention provides a method of cutting continuous planar substrates charged with pharmaceutically active agents, comprising cutting a continuous planar substrate with one or more cutting lasers, wherein the continuous substrate is transported in a free-floating manner in a cutting zone located between a first and second pair of rollers.

DETAILED DESCRIPTION OF THE INVENTION

The present invention provides an apparatus and methods for cutting planar substrates charged with pharmaceutically active agents and more particularly transdermal systems (TDSs) and orally administered active agent films or orally dissolvable films (ODFs).

In one embodiment, the substrate to be cut by the apparatus of the present invention is fabricated as a continuous substrate or roll stock capable of being transported by the feeding mechanism of the apparatus of the invention. The substrate can be a single layer or multiple layers, wherein at least one layer comprises one or more active pharmaceutical agents.

In one embodiment, the feeding mechanism of the apparatus comprises a first and a second pair of rollers. Such pairs of rollers are capable of feeding the continuous substrate by applying torque to the continuous substrate. The area between the pairs of rollers forms a cutting zone or space wherein the substrate can be cut with a suitable cutting laser.

In another embodiment, the method of the invention comprises clamping a continuous substrate in a free-floating manner between the roller pairs and cutting the substrate in the cutting zone. The substrate can be fed in a free-floating manner through the roller pairs alone or in combination with a support layer and/or a cover layer. As used herein, the term "substrate" or the phrase "continuous substrate" refers to the substrate that is incorporated into the finished product and can include the support and/or cover layer employed during the cutting process. Such support layer and/or cover layer can be part of the finished product or one or both can be discarded after the substrate has been cut. In one embodiment, the substrate can be transported through the cutting zone at a constant speed, intermittently, or any combination thereof. In another embodiment, the substrate can be transported in an upstream and/or downstream direction during the cutting process.

The apparatus of the present invention further comprises one or more cutting lasers suitable for cutting the continuous substrate. The one or more cutting lasers are positioned such that they are capable of cutting the free-floating substrate between the roller pairs of the apparatus. The cutting laser may be a single laser placed above or below the free-floating substrate. Alternatively, the apparatus can comprise two cutting lasers wherein both lasers are located above or below the substrate between the roller pairs. In another embodiment, one of the cutting lasers is located above the substrate and the other is located below the substrate. Selection and placement of the laser or lasers can be readily determined by one skilled in the art. Criteria for selection can include the substrate to be cut and the manner in which it is to be cut. In one embodiment, the cutting laser can be a laser capable of etching the substrate. Such etching can be used to apply letters, numbers, or other images to the substrate for identification or other marking purposes.

Cutting the continuous substrate in a free-floating manner with a suitable laser has a number of advantages. Since the cutting laser cuts the substrate in a contact-free fashion, it is not necessary for the substrate or the cutting apparatus to absorb substantial counteracting forces, such as for example, those imposed by a cutting knife or a die cutting tool. Furthermore, having the substrate free-floating allows for partial or full cuts of the substrate from both sides of the substrate simultaneously. For example, one cutting laser may be placed above the free-floating substrate and may etch a product identifying image in the substrate and a second cutting laser can be placed below the free-floating substrate to perform complete cuts of the substrate into final product forms.

As used herein, the term "cutting" is understood to mean cutting completely or partially through a single layer substrate, or partially or completely through one or more layers of a multi-layer substrate. For purposes of the present invention, the term cutting also includes etching.

In a further embodiment of the invention, the continuous substrate is transported by the first and second pairs of rollers through the cutting zone under tension. Such tension on the substrate can be created in a variety of ways. In one embodiment, the first pair of rollers upstream of the cutting zone is capable of applying a braking force or detent torque to the substrate. In another embodiment, the second pair of rollers rotates under the power of a motor in a downstream direction away from the first pair of rollers, creating a displacement torque on the substrate. The detent torque created by the first pair of rollers and the displacement torque created by the second pair of rollers creates tension on the substrate to be cut. The amount of detent torque and the amount of displacement torque can be adjusted to create the desired amount of tension on the substrate. Those skilled in the art can readily determine the desired amount of tension for each substrate to be cut. In another embodiment, the first pair of rollers is further capable of rotating in an upstream direction away from the second pair of rollers. In such an embodiment, tension on the substrate is created as a result of the roller pairs rotating in opposite directions away from each other.

In one embodiment of apparatus of the present invention, the feeding mechanism is capable of transporting the substrate in an upstream and downstream direction.

In another embodiment, the apparatus of the present invention further comprises a means for separating a layer and/or portions of the substrate that are superfluous after the cutting process. Such means is located downstream of the cutting zone and can be attached to or otherwise associated with the second pair of rollers that are part of the feeding mechanism. For example, an appropriate separating blade or a means of removing a cover layer can be used to ensure that segments of the substrate remaining on a support layer after the cutting process are preserved and that the cover layer and/or other excess components of the substrate are removed and/or discarded after the substrate has been cut. Corresponding guides for maintaining the separation of the desired components and the removed or discarded components are well known in the art.

In one embodiment, the apparatus of the present invention is free of lateral guides for the continuous substrate within the cutting zone. The absence of one or more guides for the substrate allows for the largest available area of the continuous substrate to be cut by the cutting laser.

Cutting lasers suitable for cutting single and multi-layer continuous substrates are known in the art. In one embodiment, the apparatus of the present invention further comprises one or more mechanisms for controlling the cutting laser. The depth and shape of the cut performed by the cutting laser can be controlled by one or more focusing devices and/or power controls. Means of focusing and/or power regulation of the laser can control the type of material to be cut, and the depth and shape of the cuts performed by the cutting laser. For example, appropriate control means can provide a laser that will not cut through a support layer located below a planar substrate charged with pharmaceutically active agents, whereas the planar substrate itself can be cut by the laser. It is thus possible to cut out substrate sections, which are later individually separable from the support layer, without cutting or damaging the support layer. In another embodiment, the control mechanisms are used to cut a substrate underneath a cover layer that is otherwise transparent to laser light, thus allowing for the substrate to be cut without cutting the cover layer. In a further embodiment, the control mechanism can be used to control the laser such that the laser etches the substrate with an inscription or a decoration in the form of laser lettering or laser engraving. Such etching can be applied to a cover layer, support layer, and/or the substrate layer or layers charged with pharmaceutically active agents.

In a particular embodiment, the mechanism for controlling the cutting lasers is a computer numerical control or "CNC."

The use of computer control, particularly of CNC, allows the cutting laser to cut almost any shape and do so at a considerably higher processing speed than traditional cutting methods and in a continuous fashion. Therefore, output capacity of an industrial-scale production of appropriately cut-out substrate charged with one or more pharmaceutically active agents can be increased. In addition, the shape of the cut or cuts performed by the cutting laser can easily be changed by changing the program used by the CNC. Thus, changes in size or shape of the TDS or ODF being produced are quick, simple, and inexpensive since such changes only require changing the software or other control program used by the CNC rather than physically changing cutting tools or cutting blades. Changes made to the cutting laser can include focal length, frequency, and cutting speed. Furthermore, identifying characteristics such as letters, numbers or logos can be etched into the substrate or other suitable layer during the cutting process, thus reducing or eliminating the need for an additional step, post-cutting, to apply such identifying characteristics?

The apparatus and methods of the present invention can also be used for cutting small pieces of film-like materials formed from powders, in particular starch films, such as those used in some ODF applications.

The substrate for orally dissolvable films or strips can be produced from a number of products and in a number of ways, for example, as described in Dixit, R. P. et al., *Journal of Controlled Release* 139 (2009) 94-107, and incorporated herein by reference. A substrate for an ODF applications can be formed into a planar continuous substrate for use in the present invention by any means known in the art.

The examples described below are representative of particular embodiments of the invention. Such examples are not, however, limiting with respect to the scope of the invention and those skilled in the art can readily appreciate variations and modifications of the embodiments, each of which alone and collectively are encompassed by the present invention.

As represented in FIG. 1, device 1 comprises a first pair of rollers 2 as well as a second pair of rollers 3 and a continuous substrate 4, which is capable of being transported by the roller pairs through a cutting zone 5, located between the roller pairs. The cutting zone 5 between the roller pairs 2 and 3, is designed so that the continuous substrate 4 is held in a suspended or free-floating manner in the cutting zone. A laser cutting device 6 performs cutting operations on the substrate 4.

In one embodiment, the second pair of rollers 3 is driven by a servomotor, while the first pair of rollers 2 is equipped with a resistance producing device or a braking device. The combined control of the servomotor and the resistance or braking device provide a defined tension on the continuous substrate 4 located in the cutting zone 5. The cutting laser 6 can be moved by an X-Y control during the cutting process such that cutting can proceed while the continuous substrate 4 is transported in the downstream transport direction 7.

The cutting depth 8 of the cutting laser 6 can be adjusted by means of an appropriate setting of the focusing device 9 and/or by power regulation of the cutting laser 6. The cut 10 produced by the cutting laser 6 can completely cut through the continuous substrate 4 or it can produce partial cuts such as perforations.

Figure 2:
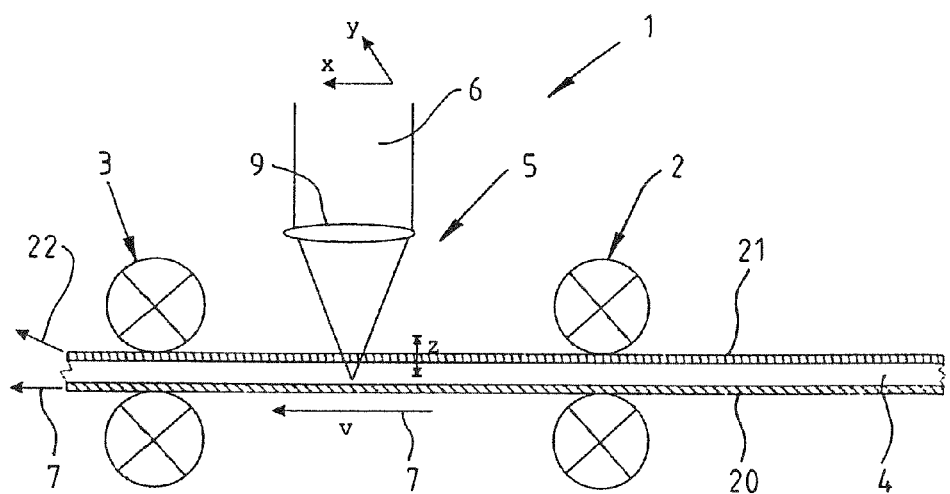
FIG. 2 is a schematic of one embodiment of an apparatus of the present invention wherein the planar substrate is continuous multilayer substrate.

As represented in FIG. 2, the continuous substrate 4 is a single or multi-layer continuous substrate charged with one or more pharmaceutically active agents. A support layer 20 located below the substrate 4 and a surface or cover layer 21 is located above the substrate 4. The pairs of rollers 2 and 3, transport the multilayer system in the downstream transport direction 7 through the cutting zone 5. The cutting laser 6 is capable of cutting through all of the layers or only particular component layers of the multi-layer substrate via an appropriate selection of the cutting depth 8. In particular, in the case where the cover layer 21 is transparent to the wavelength of the cutting laser, it is possible for the focusing unit 9 to allow the cutting laser 6 to act only on the substrate layer charged with the pharmaceutically active agent. Thus, in one embodiment, the method of cutting a multi-layer substrate comprises cutting the continuous substrate between two unaffected layers consisting of the support layer 20 and the cover layer 21.

Means for removing the cover layer 21 can be provided downstream of the cutting zone 5 and the second roller pair 3, said means separating the cover layer 21 from the support layer 20 and substrate 4, in a stripping direction 22 while the substrate 4 is transported in the downstream transport direction 7.

Figure 3:
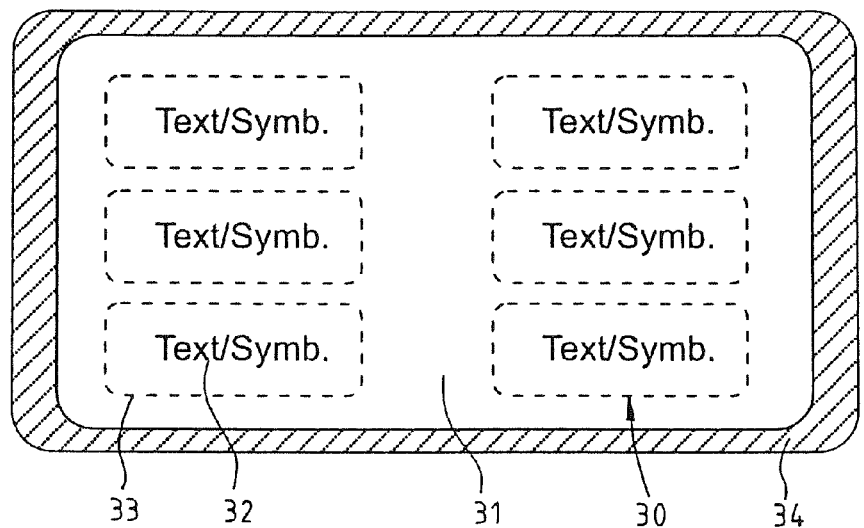
FIG. 3 is a schematic of a TDS capable of being cut by an embodiment of the present invention.

FIG. 3 represents a transdermal system with pharmaceutically active agent plaster, wherein contour 30, indicated by broken lines, was cut as perforations into continuous planar substrate 31. The inner area of contour 30 contains engraved lettering 32, which can, for example, comprise a trade name or a logo. Cutline 33, which surrounds contour 30, separates an inner area of the contour, which is intended for later application to the skin or oral administration of the substrate charged with pharmaceutically active agents, from a surrounding region of continuous planar substrate 31. Support layer 34, which is not necessarily present in all embodiments, can be removed after continuous planar substrate 31 is cut.

Figure 4:
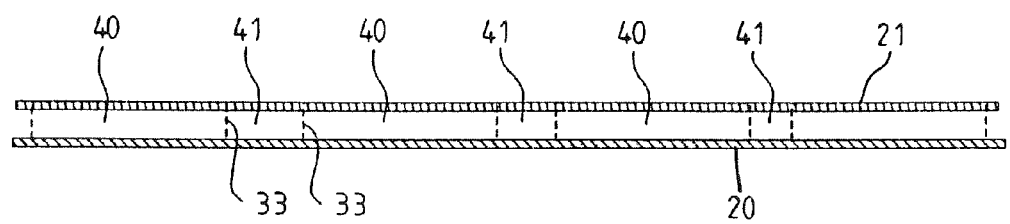
FIG. 4 is a schematic of a multilayer continuous substrate cut by an embodiment of the present invention.

FIG. 4 represents a multi-layer continuous planar substrate comprising support layer 20, cut substrate element 40 charged with pharmaceutically active agents, and cover layer 21. Cut substrate element 40 is a TDS or ODF. Waste region 41, which can be removed at a later time, is defined by cut lines 33, and is located between cut substrate element 40.

Figure 5:
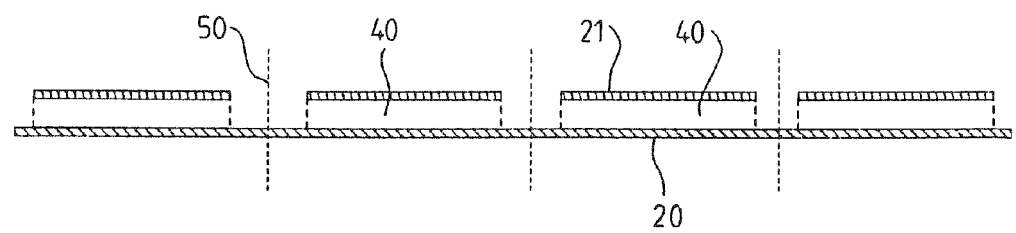
FIG. 5 is a schematic of a second multilayer continuous substrate cut by an embodiment of the present invention.

FIG. 5 represents a TDS or ODF as produced by one embodiment of the method and apparatus of the present invention. Cut substrate element 40 is attached to support layer 20 and lies below cover layer 21. Waste regions 41 between cut substrate elements 40 have been removed. Cut line 50 indicates the position of a subsequent cut for portioning the individual cut substrate elements 40 charged with pharmaceutically active agents.

The invention claimed is:

1. An apparatus for cutting continuous planar substrates charged with pharmaceutically active agents, wherein the apparatus comprises:
   i) a feeding mechanism, wherein the feeding mechanism comprises a first and a second pair of rollers;
   ii) a cutting zone, wherein the cutting zone is between the pairs of rollers; and
   iii) one or more cutting lasers capable of making segment-like cuts in the continuous planar substrate within the cutting zone,
wherein the continuous planar substrate is charged with one or more pharmaceutically active agents, wherein the first pair of rollers is positioned upstream of the cutting zone, and the second pair of rollers is positioned downstream of the cutting zone, and the first and second pairs of rollers are capable of creating tension on the substrate, and wherein the first pair of rollers is capable of applying a braking force or detent torque to the substrate and the second pair of rollers is capable of applying displacement torque on the substrate.

2. An apparatus for cutting continuous planar substrates charged with pharmaceutically active agents, wherein the apparatus comprises:

i) a feeding mechanism, wherein the feeding mechanism comprises a first and a second pair of rollers;
ii) a cutting zone, wherein the cutting zone is between the pairs of rollers; and
iii) one or more cutting lasers capable of making segment-like cuts in the continuous planar substrate within the cutting zone, wherein the continuous planar substrate is charged with one or more pharmaceutically active agents, wherein the first pair of rollers is positioned upstream of the cutting zone, and the second pair of rollers is positioned downstream of the cutting zone, and the first and second pairs of rollers are capable of creating tension on the substrate, and wherein the first pair of rollers and the second pair of rollers are capable of creating tension on the substrate by rotating in opposite directions away from each other.

\* \* \* \* \*